US012584341B2

(12) United States Patent
Sato

(10) Patent No.: US 12,584,341 B2
(45) Date of Patent: Mar. 24, 2026

(54) OPENING/CLOSING MEMBER CONTROL DEVICE

(71) Applicant: DENSO CORPORATION, Kariya-city (JP)

(72) Inventor: Keitaro Sato, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 18/218,778

(22) Filed: Jul. 6, 2023

(65) Prior Publication Data

US 2023/0349217 A1    Nov. 2, 2023

Related U.S. Application Data

(63) Continuation of application No. PCT/JP2022/001706, filed on Jan. 19, 2022.

(30) Foreign Application Priority Data

Jan. 21, 2021    (JP) ................................. 2021-007812

(51) Int. Cl.
        *E05F 15/41*        (2015.01)
        *B60J 1/17*         (2006.01)
        *E05F 15/689*       (2015.01)
(52) U.S. Cl.
        CPC ................. *E05F 15/41* (2015.01); *B60J 1/17* (2013.01); *E05F 15/689* (2015.01); *E05Y 2400/304* (2024.05); *E05Y 2400/44* (2013.01); *E05Y 2400/528* (2024.05)

(58) Field of Classification Search
        CPC ............. E05F 15/689; E05Y 2400/304; E05Y 2400/528; E05Y 2900/55; H02P 29/028
        See application file for complete search history.

(56) References Cited

U.S. PATENT DOCUMENTS

| | | | | |
|---|---|---|---|---|
| 5,616,997 | A * | 4/1997 | Jackson ............... | H02H 7/0851 |
| | | | | 318/467 |
| 5,963,001 | A * | 10/1999 | Peter .................... | H02H 7/0851 |
| | | | | 318/563 |
| 6,064,165 | A * | 5/2000 | Boisvert .............. | H02H 7/0851 |
| | | | | 388/903 |
| 6,282,759 | B1 * | 9/2001 | Czaloun ................ | F16G 11/048 |
| | | | | 24/132 R |
| 6,404,158 | B1 * | 6/2002 | Boisvert .............. | H02H 7/0851 |
| | | | | 318/565 |

(Continued)

FOREIGN PATENT DOCUMENTS

| | | |
|---|---|---|
| JP | 2002-174076 A | 6/2002 |
| JP | 3740951 B2 | 2/2006 |

(Continued)

*Primary Examiner* — Rina I Duda
(74) *Attorney, Agent, or Firm* — Oliff PLC

(57) ABSTRACT

An opening/closing member control device includes a control section configured to control a motor for opening and closing an opening/closing member and determine whether an entrapment occurs when closing the opening/closing member. The control section is further configured to supply a prestored drive voltage to the motor when closing the opening/closing member, and maintain supply of the prestored drive voltage until it is determined that an entrapment has occurred, even if the acquired load information fluctuates.

12 Claims, 3 Drawing Sheets

(56)         References Cited

U.S. PATENT DOCUMENTS

| | | | |
|---|---|---|---|
| 6,840,113 B2 * | 1/2005 | Fukumura ............ | H02H 7/0851 |
| | | | 73/761 |
| 2003/0056600 A1 * | 3/2003 | Shank .................. | H03K 17/975 |
| | | | 73/780 |
| 2004/0065498 A1 * | 4/2004 | Onozawa ................ | G05B 9/02 |
| | | | 180/289 |
| 2007/0018235 A1 * | 1/2007 | Arai ................... | G11C 16/0483 |
| | | | 257/E21.209 |
| 2014/0239867 A1 * | 8/2014 | Bessho ................ | H02P 29/032 |
| | | | 318/466 |

FOREIGN PATENT DOCUMENTS

| | | | |
|---|---|---|---|
| JP | 4063094 | B2 | 3/2008 |
| JP | 4485782 | B2 | 6/2010 |
| JP | 6776921 | B2 | 10/2020 |

* cited by examiner

OPENING/CLOSING MEMBER CONTROL DEVICE

CROSS-REFERENCE TO RELATED APPLICATION

The present application is a continuation application of International Application No. PCT/JP2022/001706, filed on Jan. 19, 2022, which claims priority to Japanese Patent Application No. 2021-007812, filed on Jan. 21, 2021. The contents of these applications are incorporated herein by reference in their entirety.

BACKGROUND

Technical Field

The present disclosure relates to an opening/closing member control device.

Background Art

A type of opening/closing member control device, such as a power window control device, is known in the prior art, which uses feedback control to bring the drive speed of an opening/closing member close to a target value, such as a constant speed value, by varying the drive voltage supplied to a motor. With such an opening/closing member control device, when closing the opening/closing member, a judgement is made as to whether an entrapment has occurred, and if it is determined that an entrapment has occurred, then, for example, the motor is driven in the opposite direction, for opening the opening/closing member.

SUMMARY

In the present disclosure, provided is an opening/closing member control device as the following.

The opening/closing member control device includes a control section configured to control a motor for opening and closing an opening/closing member and determine whether an entrapment has occurred when closing the opening/closing member. The control section is further configured to supply a prestored drive voltage to the motor when closing the opening/closing member, and maintain supply of the prestored drive voltage until it is determined that an entrapment has occurred, even if the acquired load information fluctuates.

BRIEF DESCRIPTION OF THE DRAWINGS

The above and other objects, features and advantages of the present disclosure will become clearer from the detailed description below with reference to the accompanying drawings. The drawings are.

DETAILED DESCRIPTION OF THE PREFERRED EMBODIMENTS

Patent Document 1: JP 2002-174076

With an opening/closing member control device as described in PTL. 1, in order to prevent an erroneous judgement that an entrapment has occurred when no entrapment has actually occurred, a certain amount of time elapses from the time at which an entrapment actually begins until a determination is made that the entrapment has occurred. However the problem thereby arises with such an opening/closing member control device that, the drive voltage is increased in order to cancel a decrease in the drive speed due to increased load during the period until it is determined that the entrapment has occurred, and the entrapment load increases when it is determined that the entrapment has occurred.

An object of the present disclosure is to provide an opening/closing member control device capable of reducing the entrapment load at the time when it is determined that an entrapment has occurred.

According to one aspect of the present disclosure, an opening/closing member control device includes a control section configured to control a motor for opening and closing an opening/closing member and determine whether an entrapment has occurred when closing the opening/closing member. The control section is further configured to supply a prestored drive voltage to the motor when closing the opening/closing member, and maintain supply of the prestored drive voltage until it is determined that an entrapment has occurred, even if the acquired load information fluctuates.

According to this configuration, a prestored drive voltage is supplied to the motor when closing the opening/closing member, so that the drive speed of the opening/closing member is based on the prestored drive voltage. Even if the acquired load information fluctuates, the supplying of the prestored drive voltage is maintained until it is determined that the entrapment has occurred, and thus the drive voltage is not increased such as to cancel a decrease in drive speed due to increased load during the period until it is determined that the entrapment has occurred. It is thereby made possible to reduce the entrapment load at the time when it is determined that an entrapment has occurred.

An embodiment of the power window control device will be described below with reference to FIGS. 1 to 5.

Figure 1:
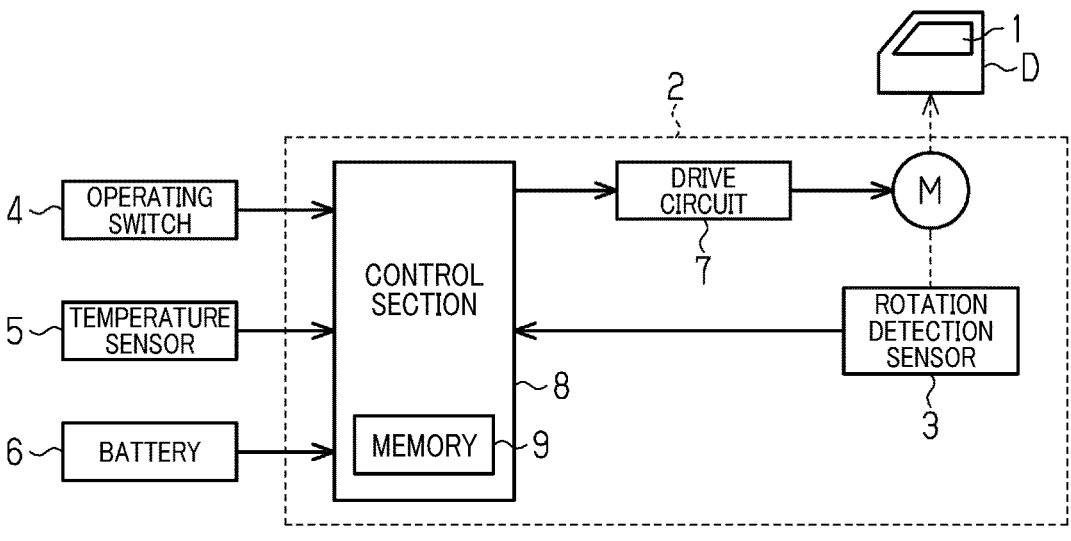
FIG. 1 is a schematic circuit diagram of a power window device according to an embodiment.

As shown in FIG. 1, a window glass 1 is provided as an opening/closing member on a vehicle door D, with the window glass 1 being coupled to be driven, via a regulator or the like (not shown in the drawing), by a motor M of a power window device 2 that functions as an opening/closing member control device. The window glass 1 is opened and closed by driving the motor M.

The power window device 2 includes a rotation detection sensor 3 such as a Hall IC that detects the rotation speed of the motor M. Furthermore, the power window device 2 includes a control section 8 that supplies a drive voltage to the motor M by controlling the duty ratio of a drive circuit 7, with the control being based on signals from the rotation detection sensor 3, from an operating switch 4, from a temperature sensor 5, the voltage of the battery 6, etc.

The control section 8 is configured of (1) one or more processors that execute various processes in accordance with a computer program (software), (2) one or more dedicated hardware circuits such as an application specific integrated circuit (ASIC) that executes at least part of the various processes, or (3) a combination of the above. The processor includes a CPU and memory 9, such as RAM and ROM, which store program code or instructions configured to cause the CPU to execute the processes. The memory 9 which serves as computer readable media includes any available media that can be accessed by a general-purpose computer or special purpose computer.

Based on load information acquired when the window glass 1 is driven, the control section 8 causes the memory 9 to store drive voltages corresponding to each of respective positions of the window glass 1, and supplies the drive voltages stored in the memory 9 to the motor M for controlling the motor M. That is to say, the load of the window glass 1 varies in accordance with each of respective positions within the opening and closing range, and hence the drive speed varies even if a constant drive voltage is supplied to the motor M. For that reason, the control section 8 supplies stored drive voltages corresponding to each of respective positions of the window glass 1 to the motor M. Note that the term "stored drive voltage" referred to here is not limited to being an actual voltage value such as 9.0 volts, and may be a numerical value corresponding to an actual voltage. The control section 8 stores in the memory 9 respective drive voltages for the closing operation and drive voltages for the opening operation. The control section 8 of the present embodiment causes the memory 9 to store drive voltages that cause the window glass 1 to operate at a constant drive speed. However, it would be equally possible for the controller 8 to store drive voltages in the memory 9 such as to cause the window glass 1 to stop at a slow drive speed, when it reaches the fully closed position or the fully open position.

The control section 8 judges whether an entrapment has occurred during closing of the window glass 1. Specifically, when closing the window glass 1, if the control section 8 of the present embodiment judges, for example, based on the signal from the rotation detection sensor 3 constituting the acquired load information, that the rotation speed of the motor M has become equal to or less than a predetermined threshold value, then it is determined that an entrapment has occurred. If it is determined that an entrapment has occurred, the control section 8 supplies the motor M with a drive voltage that is higher than the normal drive voltage for opening the window glass 1, to open the window glass 1. The "normal drive voltage" for the opening operation mentioned here is, for example, a drive voltage for an opening operation that is based on a signal from the operating switch 4.

The control section 8 also judges whether an entrapment has occurred during opening of the window glass 1. Specifically, when opening the window glass 1, if the control section 8 of the present embodiment judges, for example, based on the signal from the rotation detection sensor 3 constituting the acquired load information, that the rotation speed of the motor M has become equal to or less than a predetermined threshold value, then it is determined that an entrapment has occurred. If it is determined that an entrapment has occurred, the control section 8 supplies the motor M with a drive voltage that is higher than the normal drive voltage for closing the window glass 1, to close the window glass 1. The "normal drive voltage" referred to here is, for example, a drive voltage for the closing operation that is based on a signal from the operating switch 4.

Moreover when closing the window glass 1, the control section 8 continues to supply the prestored drive voltage until it is determined that an entrapment has occurred, even if there is fluctuation of the acquired load information, that is, of the signal from the rotation detection sensor 3.

Furthermore, when opening the window glass 1, the control section 8 continues to supply the prestored drive voltage until it is determined that an entrapment has occurred, even if there is fluctuation of the acquired load information, that is, of the signal from the rotation detection sensor 3.

In addition, based on the load information acquired when driving the window glass 1, that is, the signal from the rotation detection sensor 3, the control section 8 stores in the memory 9 the drive voltages to be used when driving the window glass 1 from the next time onward. Specifically, if the rotation speed of the motor M acquired when driving the window glass 1 is higher or lower than the target value, the control section 8 stores drive voltages in the memory 9 for bringing the rotation speed close to the target value. Note that the target value in this embodiment is a constant value of rotation speed.

Moreover the control section 8 corrects the stored drive voltages based on the acquired outside air temperature. Specifically, for example, if it is determined that the outside air temperature is higher than or lower than a reference temperature value based on the signal from the temperature sensor 5 indicating the acquired outside air temperature, the control section 8 of the present embodiment 8 first acquires the rotation speed of the motor M then converts that to a rotation speed corresponding to the reference temperature. If the converted rotation speed is more or less than the target value, the control section 8 stores, in the memory 9, drive voltages for bringing the rotation speed close to the target value.

Furthermore, the control section 8 corrects the drive voltages supplied to the motor M based on the acquired outside air temperature value. Specifically, for example, if it is determined that the outside air temperature is higher or lower than the reference temperature based on the signal from the temperature sensor 5 indicating the acquired outside air temperature value, the control section 8 of the present embodiment corrects the drive voltages supplied to the motor M such as to bring the rotation speed close to the target value.

Figure 4:
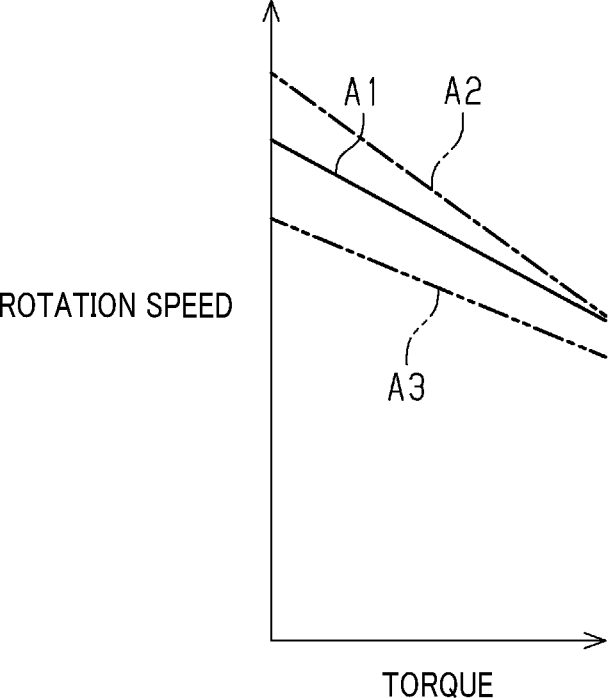
FIG. 4 is a characteristic diagram of rotation speed versus torque for each of respective temperatures of a motor in the embodiment.

For example, FIG. 4 shows characteristics A1 to A3 of the rotation speed of the motor M with respect to torque, at each of respective temperatures. Specifically, the characteristic A1 for the reference temperature of 20° C., the characteristic A2 for 80° C., and the characteristic A3 for −30° C. are shown. The control section 8 corrects the drive voltage to be stored and the drive voltage to be supplied, as described above, based on the acquired outside air temperature value and the characteristics shown in FIG. 4.

Next, specific details of the operation of the power window device 2 described above will be described with reference to FIGS. 2 and 3.

Figure 2:
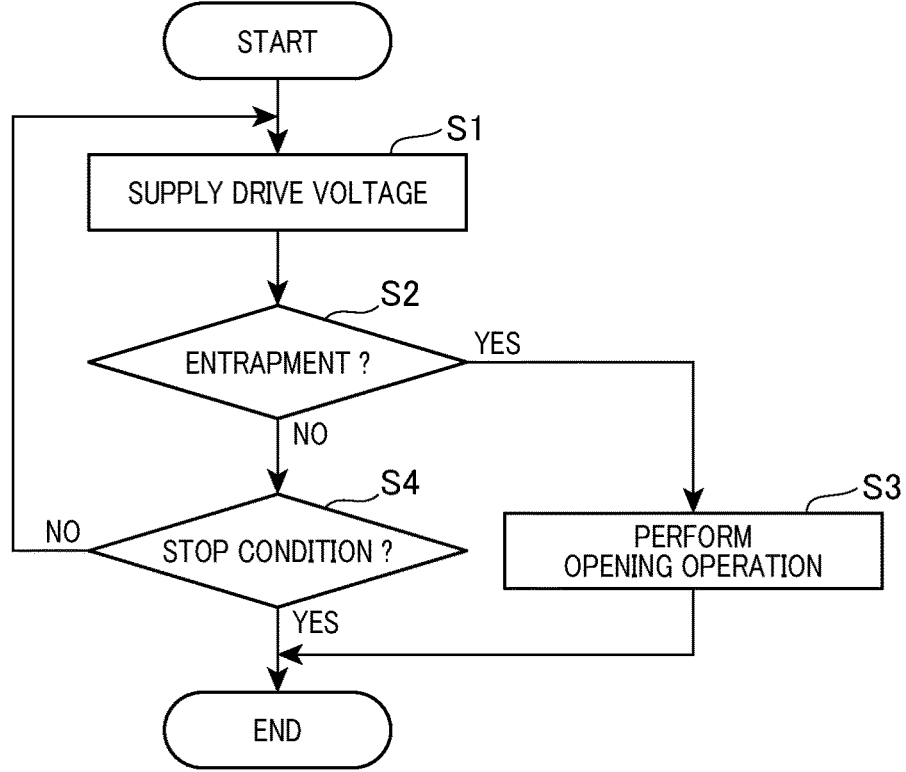
FIG. 2 is a flowchart for explaining drive processing by a control section in the embodiment.
Figure 3:
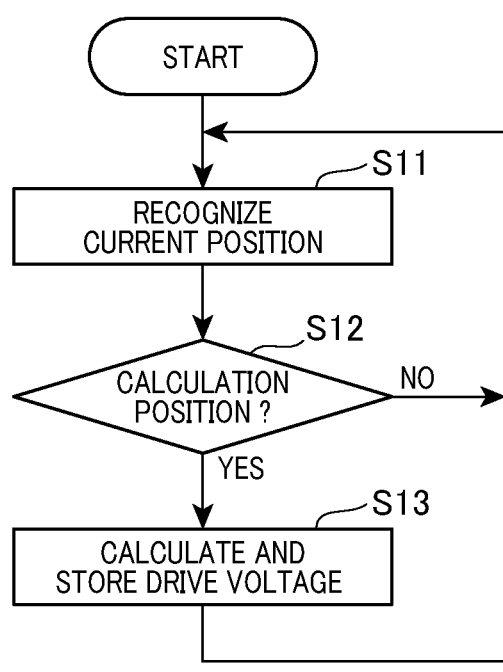
FIG. 3 is a flowchart for explaining storage processing by the control section in the embodiment.

When the operating switch 4 is operated for closing the window glass 1, the control section 8 performs a drive process from step S1 onwards, as shown in FIG. 2.

In step S1, the control section 8 supplies a prestored drive voltage to the motor M, and proceeds to step S2. Specifically, the control section 8 reads out from the memory 9 the drive voltage value corresponding to each of respective positions of the window glass 1, controls the duty ratio of the drive circuit 7, and outputs the drive voltage corresponding to each of respective positions of the window glass 1 to the motor M. At this time, if the acquired outside air temperature value is higher or lower than the reference temperature value, the control section 8 corrects the drive voltage supplied to the motor M.

In step S2, the control section 8 judges whether an entrapment has occurred, and if the control section 8 judges that an entrapment has occurred, the process proceeds to step S3.

In step S3, the control section 8 supplies the motor M with a drive voltage for opening the window glass 1 during only a fixed interval. At that time, the control section 8 supplies the motor M with a drive voltage for opening the window glass 1 that is higher than the normal drive voltage for opening the window glass 1. The process then ends.

On the other hand, in step S2, the control section 8 judges whether an entrapment has occurred. If the control section 8 judges that an entrapment has not occurred, the process proceeds to step S4.

In step S4, the control section 8 judges whether a stop condition is satisfied. If it is determined that the stop condition is not satisfied, the process proceeds to step S1, and if it is determined that the stop condition is satisfied, the process ends. The stop condition is satisfied, for example, when the operating switch 4 is operated for halting the window glass 1.

During closing of the window glass 1, the control section 8 performs the memory processing of step S11 and subsequent steps in parallel with the drive processing described above, as shown in FIG. 3.

In step S11, the control section 8 recognizes the current position of the window glass 1, and proceeds to step S12.

In step S12, the control section 8 judges whether the position of the window glass 1 is a predetermined calculation position. If the position is not a calculation position, the process returns to step S11, whereas the process proceeds to step S13 if the position is a calculation position. The calculation positions are set, for example, by dividing the motion range of the window glass 1 into a number of positions at equal separations.

In step S13, if the rotation speed of the motor M acquired when driving the window glass 1 is higher or lower than the target value, the control section 8 calculates a value of drive voltage for bringing the rotation speed close to the target value, and stores that drive voltage in the memory 9. The process then proceeds to step S11. Note that the control section 8 repeats the above memory processing until the window glass 1 stops, and when the window glass 1 stops, the memory processing is ended.

Next, specific actions of the power window device 2 will be described with reference to FIG. 5.

Figure 5:
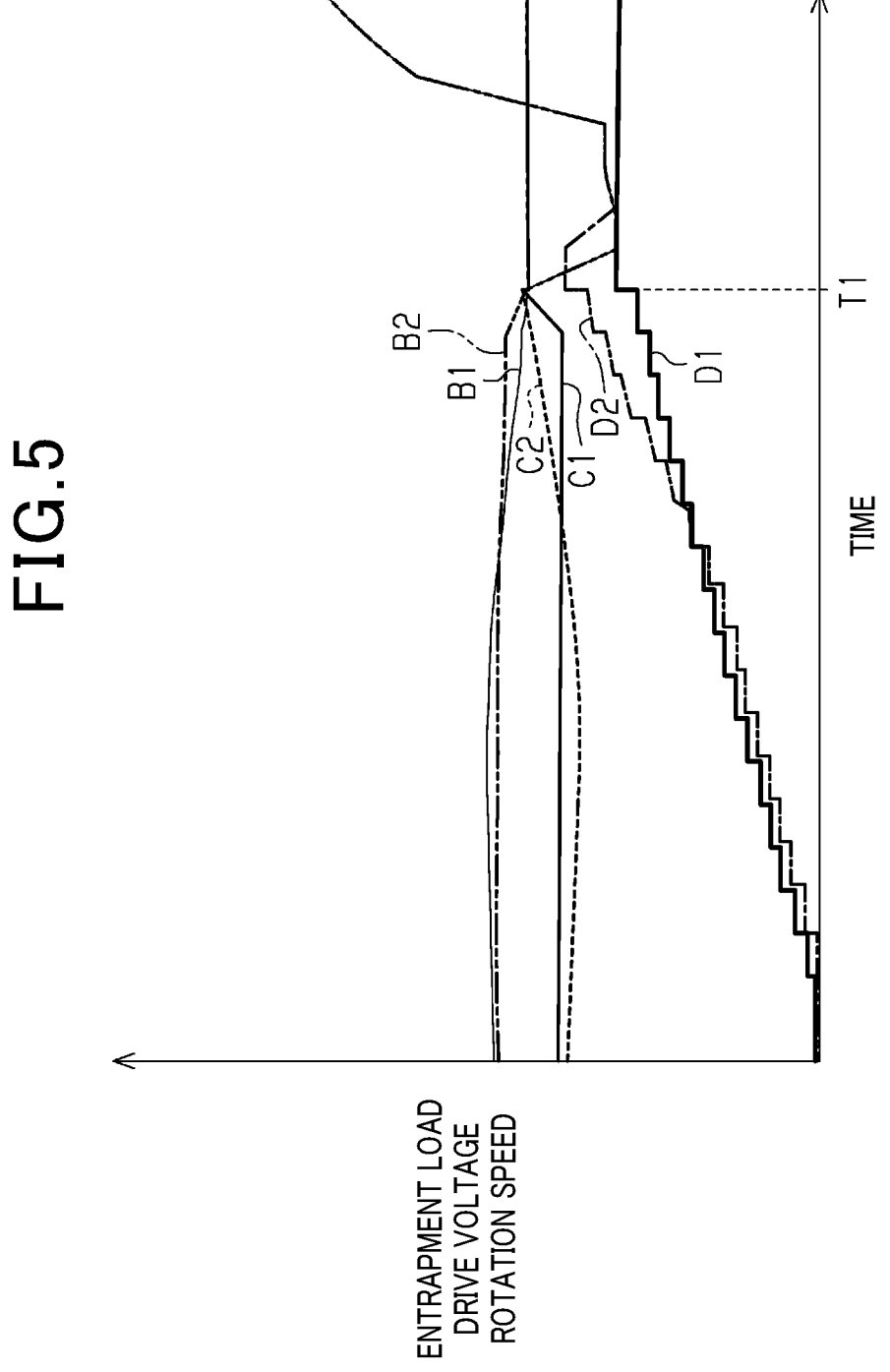
FIG. 5 is a waveform diagram for explaining the action of the power window device.

FIG. 5 shows waveforms with respect to time of the rotation speed B1 of the motor M, the drive voltage C1 supplied to the motor M, and the entrapment load D1, when closing the window glass 1, with the power window device 2 of this embodiment. FIG. 5 also shows waveforms with respect to time of the rotation speed B2 of the motor M, the drive voltage C2 supplied to the motor M, and the entrapment load D2, with a conventional power window device that performs feedback control.

If for example a foreign object becomes entrapped when closing the window glass 1, the entrapment load D1 of the foreign object gradually increases, as shown in FIG. 5. With the power window device 2 of this embodiment, even if the acquired load information fluctuates, that is, even if the rotation speed B1 decreases, the prestored drive voltage C1 is maintained until it is determined that the entrapment has occurred. On the other hand, with a conventional power window device that performs feedback control, when the rotation speed B2 starts to decrease, the drive voltage C2 is increased in order to cancel the decrease in the rotation speed B2. As a result, with a conventional power window device that performs feedback control, the entrapment load D2 increases at the timing Ti, immediately after it is determined that an entrapment has occurred. However with the present embodiment, the magnitude of the entrapment load D1 at that time can be kept small.

Note that after it is determined that an entrapment has occurred, the drive voltage C1 is supplied in the opposite direction, to open the window glass 1 and thereby eliminate the state in which the foreign object is entrapped. At this time, a drive voltage higher than the normal drive voltage for opening the window glass 1 is supplied to the motor M, so that the window glass 1 is opened quickly.

Furthermore, if a foreign object becomes entrapped during opening of the window glass 1, the same operation is performed as during the closing operation described above. As a result, whereas with a conventional power window device that performs feedback control, the entrapment load has become large at the time when it is determined that an entrapment has occurred, with the power window device 2 of this embodiment, the entrapment load can be kept small.

The effects obtained with the above embodiment are as follows.

(1) During closing of the window glass 1, prestored drive voltages are supplied to the motor M, so that the drive speed of the window glass 1 is based on drive voltages stored previously. Even if the acquired load information fluctuates, the supplying of the prestored drive voltages is maintained until it is determined that an entrapment has occurred. Thus, during the period until it is determined that the entrapment has occurred, the drive voltages are not increased in order to cancel out a decrease in drive speed due to the increase in load. Hence, it is made possible to reduce the entrapment load at the time when it is determined that an entrapment has occurred.

(2) When it is determined that an entrapment has occurred, a drive voltage higher than the normal drive voltage for opening the window glass 1 is supplied to the motor M to open the window glass 1. Hence, the entrapment condition can be quickly resolved.

(3) Since the drive voltages supplied to the motor M are corrected based on the acquired outside air temperature, the drive speed of the window glass 1, which changes depending on the outside air temperature, can be brought close to a target value. With this embodiment, the target value is a predetermined constant speed value.

(4) The drive voltages to be used from the next drive time onward are stored based on the drive speed which serves as load information acquired when the window glass 1 is driven. Hence the drive speed of the window glass 1 can be brought close to the target value even if, for example, the drive speed changes due to deterioration over time. Since the stored drive voltages are used in subsequent drive operations, the drive voltages are, of course, not increased to cancel a decrease in drive speed due to an increase in load, during the period until it is determined that an entrapment has occurred. It is thereby made possible to reduce the entrapment load at the time when it is determined that the entrapment has occurred.

(5) Since the drive voltages to be stored are corrected based on the acquired outside air temperature value, it is possible to store drive voltages that take into consideration the drive speed of the window glass 1, which varies in accordance with the outside air temperature value.

(6) Since prestored drive voltages are supplied to the motor M during opening of the window glass 1, the window glass 1 is driven at a speed based on the prestored drive voltages. Even if the acquired load information fluctuates, the supplying of the prestored drive voltages is maintained until it is determined that an entrapment has occurred. Hence, there is no increase made in the drive voltage for canceling a decrease in drive speed caused by an increase in load during the period until it is determined that the entrapment has occurred. It is thereby made possible to reduce the entrapment load at the time when it is determined that the entrapment has occurred.

This embodiment can be implemented with the following changes. The embodiment and the following modified examples can be implemented in combination with each other within a technically consistent range.

In the above embodiment, if the control section 8 judges when closing the window glass 1 that an entrapment has occurred, the control section 8 supplies the motor M with a drive voltage that is higher than the normal drive voltage for opening the window glass 1. However the present invention is not limited to this and it would be equally possible to instead supply the normal drive voltage for opening the window glass 1 to the motor M. Furthermore, in the above embodiment, if the control section 8 judges when opening the window glass 1 that an entrapment has occurred, the control section 8 supplies the motor M with a drive voltage that is higher than the normal drive voltage for closing the window glass 1. However, it would be equally possible to instead supply the normal drive voltage for closing the window glass 1 to the motor M.

In the above embodiment, the control section 8 corrects the drive voltage supplied to the motor M based on the acquired outside air temperature, however, the present invention is not limited to this, and it would be equally possible to use a configuration in which correction of the drive voltage supplied to the motor M based on the outside air temperature is not performed.

In the above embodiment, the control section 8 stores in the memory 9 the drive voltages to be used in subsequent driving based on the load information acquired when the window glass 1 is driven, however the present invention is not limited to this, and it would be equally possible to use a configuration in which, for example, once a drive voltage has been stored, it cannot be overwritten. In addition, although not specifically mentioned in the above embodiment, when the control section 8 stores in the memory 9 the drive voltages to be used in subsequent driving, it would be equally possible for the new drive voltages to be stored while also taking into consideration the drive voltages stored so far. That is, a configuration may be used in which the control section 8 performs correction by storing in the memory 9 drive voltages corresponding to respective positions to be used at subsequent drive times, wherein the stored drive voltages are based on drive voltages calculated from the load information acquired when driving the window glass 1 and on the drive voltages stored up to that point.

In the above embodiment, the control section 8 corrects the stored drive voltage based on the acquired outside air temperature, however the present invention is not limited to this, and it would be equally possible to use a configuration in which correction of the stored drive voltage based on the outside air temperature is not performed.

In the above embodiment, when opening the window glass 1, the control section 8 maintains the supplying of prestored drive voltages until it is determined that an entrapment has occurred, however the present invention is not limited to this, and it would be equally possible to use a configuration in which the drive voltages are changed before it is determined that the entrapment has occurred.

In the above embodiment, the signal from a rotation detection sensor 3, such as a Hall IC, is used as indicating the load information, and a judgement is made as to whether an entrapment has occurred based on the signal from the rotation detection sensor 3. However the present invention is not limited to this, and other signals may be used for obtaining the load information. For example, it would be equally possible for the load information to be acquired as the value of current flowing through the motor M, or acquired by directly detecting the motion speed of the window glass 1.

In the above embodiment, the control section 8 supplies the motor M with drive voltages corresponding to each of respective positions of the window glass 1, however the present invention is not limited to this, and it would be equally possible to supply the same drive voltage at all of the positions of the window glass 1 to the motor M.

In the above embodiment, a specific implementation is described for the power window device 2 for the window glass 1 as the opening/closing member. However the present invention is not limited to this, and it would be equally possible to implement an opening/closing member control device for opening and closing other types of opening/closing member.

Although the present disclosure has been described with reference to examples, it is understood that the present disclosure is not limited to those examples or structures. The scope of the present disclosure also includes various modifications and modifications that are within an equivalent range. In addition, various combinations and configurations, as well as combinations and configurations including single elements, more, or less, come within the scope and spirit of the present disclosure.

What is claimed is:

1. An opening/closing member control device comprising a control section configured to:

control a motor to open and close an opening/closing member;

acquire load information when closing the opening/closing member; and determine whether an entrapment has occurred based on the load information, wherein the control section is further configured to
      when closing the opening/closing member, supply to the motor a drive voltage that is set and stored in advance so that the opening/closing member moves at a constant moving speed, the drive voltage corresponding to each of a plurality of positions of the opening/closing member, and
      during a period in which the opening/closing member is being closed, and even if the acquired load information fluctuates, maintain supply of the drive voltage that is set and stored in advance until it is determined that an entrapment has occurred, and wherein the load information is any one of a rotation speed of the motor, a value of current flowing through the motor, and a motion speed of the opening/closing member.

2. The opening/closing member control device according to claim 1, wherein the control section is configured to, in response to determining that an entrapment has occurred, supply a drive voltage that is higher than a normal drive voltage for opening the opening/closing member to open the opening/closing member.

3. The opening/closing member control device according to claim 1, wherein the control section is configured, before determining whether an entrapment has occurred, to correct the drive voltage supplied to the motor based on an acquired outside air temperature.

4. The opening/closing member control device according to claim 1, wherein the control section is configured to store a drive voltage to be used for subsequent driving based on the load information acquired when the opening/closing member is driven.

5. The opening/closing member control device according to claim 4, wherein the control section is configured, before determining whether an entrapment has occurred, to correct the drive voltage supplied to the motor based on an acquired outside air temperature.

6. The opening/closing member control device according to claim 1, wherein the control section is configured to
determine whether an entrapment has occurred during opening of the opening/closing member,
supply the motor with a prestored drive voltage when opening the opening/closing member, and
maintain the supply of the prestored drive voltage during the opening of the opening/closing member until it is determined that an entrapment has occurred, even if the acquired load information fluctuates.

7. An opening/closing member control device comprising one or more processors programmed to:
control a motor to open and close an opening/closing member;
acquire load information when closing the opening/closing member; and
determine whether an entrapment has occurred based on the load information,
wherein the one or more processors are further programmed to
when closing the opening/closing member, cause to be supplied to the motor a drive voltage that is set and stored in a memory in advance so that the opening/closing member moves at a constant moving speed, the drive voltage corresponding to each of a plurality of positions of the opening/closing member, and

during a period in which the opening/closing member is being closed, and even if the acquired load information fluctuates, cause to be maintained supply of the drive voltage that is set and stored in the memory in advance until it is determined that an entrapment has occurred, and
wherein the load information is any one of a rotation speed of the motor, a value of current flowing through the motor, and a motion speed of the opening/closing member.

8. The opening/closing member control device according to claim 7, wherein the one or more processors are programmed to, in response to determining that an entrapment has occurred, cause to be supplied a drive voltage that is higher than a normal drive voltage for opening the opening/closing member to open the opening/closing member.

9. The opening/closing member control device according to claim 7, wherein the one or more processors are programmed, before determining whether an entrapment has occurred, to correct the drive voltage supplied to the motor based on an acquired outside air temperature.

10. The opening/closing member control device according to claim 7, wherein the one or more processors are programmed to store in the memory a drive voltage to be used for subsequent driving based on the load information acquired when the opening/closing member is driven.

11. The opening/closing member control device according to claim 10, wherein the one or more processors are programmed, before determining whether an entrapment has occurred, to correct the drive voltage supplied to the motor based on an acquired outside air temperature.

12. The opening/closing member control device according to claim 7, wherein the one or more processors are further programmed to
determine whether an entrapment has occurred during opening of the opening/closing member,
cause the motor to be supplied with a prestored drive voltage when opening the opening/closing member, and
cause the supply of the prestored drive voltage to be maintained during the opening of the opening/closing member until it is determined that an entrapment has occurred, even if the acquired load information fluctuates.

* * * * *